Patented Nov. 6, 1923.

1,473,181

UNITED STATES PATENT OFFICE.

CHARLES FUER, OF SHERIDAN, WYOMING.

PASTE COMPOSITION.

No Drawing.   Application filed October 2, 1922.   Serial No. 591,943.

*To all whom it may concern:*

Be it known that I, CHARLES FUER, a citizen of the United States, residing at Sheridan, in the county of Sheridan and State of Wyoming, have invented new and useful Improvements in Paste Compositions, of which the following is a specification.

The object of my said invention is the provision of an uncooked paste composition adapted for immediate use when mixed with cold water and possessed of high adhesive quality on various surfaces such as plaster, metal and wood, without previous sizing of the surface.

To the attainment of the foregoing the invention consists in a composition comprising clay and an appropriate syrup.

The syrup, preferably molasses, glucose or analogous syrup, is dehydrated and pulverized for use as a binder in a paste composition, wall size, calcimine and cold water paints.

The clay employed in my novel paste composition is preferably constituted as follows:

|  | Per cent. |
|---|---|
| Moisture and combined water | 10.00 |
| Silica (true) | 58.00 |
| Iron oxide | 2.96 |
| Aluminum oxide | 20.15 |
| Calcium oxide | 7.00 |
| Magnesium oxide | 1.40 |
| Sodium and potassium oxides | 00.30 |

The clay is thoroughly dried, and syrup (preferably molasses thinned with eight times its volume of water) is mixed with the clay in the proportions of 33 per cent of molasses to 67 per cent of clay. The clay is then again dried, after which it is ground and pulverized whereupon it is ready for use.

For use as a paste, the composition described is mixed with sufficient cold water to produce a paste of the consistency desired.

In the preferred embodiment of my invention the paste composition also includes sal-soda, the proportions being substantially as follows, viz:

|  | Per cent. |
|---|---|
| Clay | 65 |
| Syrup | 34 |
| Sal soda | 1 |

When the paste is to be used on bad walls, starch is added to the composition, the proportions then being substantially as follows, viz:

|  | Per cent. |
|---|---|
| Clay | 65 |
| Syrup (preferably molasses) | 30 |
| Sal soda | 1 |
| Starch | 9 |

Having described my invention what I claim and desire to secure by Letters Patent, is:

An uncooked paste composition adapted for use when mixed with cold water, comprising clay, syrup, sal-soda and starch in powder form and in the proportions of two parts of clay to one part of syrup to form the major portion of the composition, a minute part of sal-soda, and starch.

In testimony whereof I affix my signature.

CHARLES FUER.